United States Patent
Vignali

(10) Patent No.: US 12,528,589 B2
(45) Date of Patent: Jan. 20, 2026

(54) RAM AIR COOLING POWER RECOVERY

(71) Applicant: Hamilton Sundstrand Corporation, Charlotte, NC (US)

(72) Inventor: Mark G. Vignali, Simsbury, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 369 days.

(21) Appl. No.: 17/880,763

(22) Filed: Aug. 4, 2022

(65) Prior Publication Data

US 2024/0043126 A1 Feb. 8, 2024

(51) Int. Cl.
*B64D 13/08* (2006.01)
*B64D 13/06* (2006.01)

(52) U.S. Cl.
CPC ...... *B64D 13/08* (2013.01); *B64D 2013/0618* (2013.01)

(58) Field of Classification Search
CPC ............ B64D 13/08; B64D 2013/0618
See application file for complete search history.

(56) References Cited

U.S. PATENT DOCUMENTS

| | | | | |
|---|---|---|---|---|
| 2,893,204 A * | 7/1959 | Anderson | | F02C 7/185 60/39.183 |
| 4,503,666 A | 3/1985 | Christoff | | |
| 4,934,154 A * | 6/1990 | Altoz | | G11C 5/00 62/197 |
| 5,143,329 A * | 9/1992 | Coffinberry | | F02C 7/32 244/209 |
| 5,201,182 A * | 4/1993 | Grignon | | B64D 13/08 62/3.2 |
| 5,956,960 A * | 9/1999 | Niggeman | | B64D 13/06 60/785 |
| 6,127,758 A * | 10/2000 | Murry | | B64D 41/007 290/55 |
| 6,663,044 B1 * | 12/2003 | Munoz | | B64D 13/06 62/93 |
| 6,684,660 B1 * | 2/2004 | Bruno | | B64D 13/06 62/402 |
| 7,017,365 B2 * | 3/2006 | Haas | | B64D 13/06 62/401 |
| 7,845,188 B2 * | 12/2010 | Brutscher | | B64D 37/32 62/410 |
| 8,657,227 B1 * | 2/2014 | Bayliss | | B64D 13/00 244/58 |

(Continued)

FOREIGN PATENT DOCUMENTS

EP 1688603 A2 * 8/2006 ............... F02C 6/08
EP 3409903 A1 * 12/2018 ............. F01D 11/04

(Continued)

OTHER PUBLICATIONS

Extended European Search Report for European Application No. 23188636.7; Report Mail Date Dec. 4, 2023 (9 Pages).

(Continued)

*Primary Examiner* — Christopher P Ellis
(74) *Attorney, Agent, or Firm* — CANTOR COLBURN LLP

(57) ABSTRACT

A cooling system of a vehicle includes an inlet for receiving a medium. A turbine is fluidly connected to the inlet. A coupling mechanism is operably coupled to the turbine by a shaft. The medium is ram air.

9 Claims, 1 Drawing Sheet

(56) References Cited

U.S. PATENT DOCUMENTS

| | | | |
|---|---|---|---|
| 8,707,721 B2* | 4/2014 | Scherer | B64D 13/00 62/401 |
| 9,908,635 B2 | 3/2018 | Snyder | |
| 11,167,854 B2 | 11/2021 | Casado-Montero et al. | |
| 11,187,148 B1* | 11/2021 | MacDonald | F01K 23/10 |
| 12,162,607 B2* | 12/2024 | Ho | B64C 30/00 |
| 2007/0266695 A1* | 11/2007 | Lui | B64D 13/06 60/204 |
| 2008/0245054 A1* | 10/2008 | Martensson | B64C 1/38 60/267 |
| 2012/0000205 A1* | 1/2012 | Coffinberry | B64D 13/06 60/806 |
| 2016/0122027 A1* | 5/2016 | Snyder | F01D 13/00 60/767 |
| 2017/0113808 A1* | 4/2017 | Bond | B64D 41/00 |
| 2018/0155051 A1* | 6/2018 | Snyder | F01D 13/00 |
| 2019/0135440 A1* | 5/2019 | Bruno | B64D 13/06 |
| 2019/0225343 A1* | 7/2019 | Bruno | B64D 13/06 |
| 2019/0234308 A1 | 8/2019 | Dierksmeier | |
| 2020/0141327 A1* | 5/2020 | Redford | F02C 3/04 |
| 2020/0277079 A1* | 9/2020 | Retersdorf | B64D 13/06 |
| 2020/0346763 A1 | 11/2020 | Defrancesco et al. | |
| 2022/0315226 A1* | 10/2022 | Bruno | F25B 11/00 |
| 2022/0348335 A1* | 11/2022 | Ho | B64D 13/06 |
| 2023/0313737 A1* | 10/2023 | MacDonald | B64D 33/08 60/772 |
| 2024/0077234 A1* | 3/2024 | Ernst | F25B 9/004 |
| 2024/0084731 A1* | 3/2024 | Retersdorf | F02C 6/18 |
| 2024/0102417 A1* | 3/2024 | Taylor | F02C 7/10 |

FOREIGN PATENT DOCUMENTS

| | | | | |
|---|---|---|---|---|
| EP | 3514065 A1 * | 7/2019 | | B64D 13/06 |
| EP | 3945202 A1 | 2/2022 | | |
| EP | 4253742 A1 * | 10/2023 | | F01K 23/10 |
| EP | 4292937 A1 * | 12/2023 | | B64D 13/06 |
| EP | 4306416 A1 * | 1/2024 | | B64D 13/06 |
| GB | 996166 A | 6/1965 | | |
| WO | WO-2024064270 A1 * | 3/2024 | | F02C 3/10 |

OTHER PUBLICATIONS

Office Action issued in European Patent Application No. 23188636.7; Date of Mailing May 7, 2025 (7 pages).

* cited by examiner

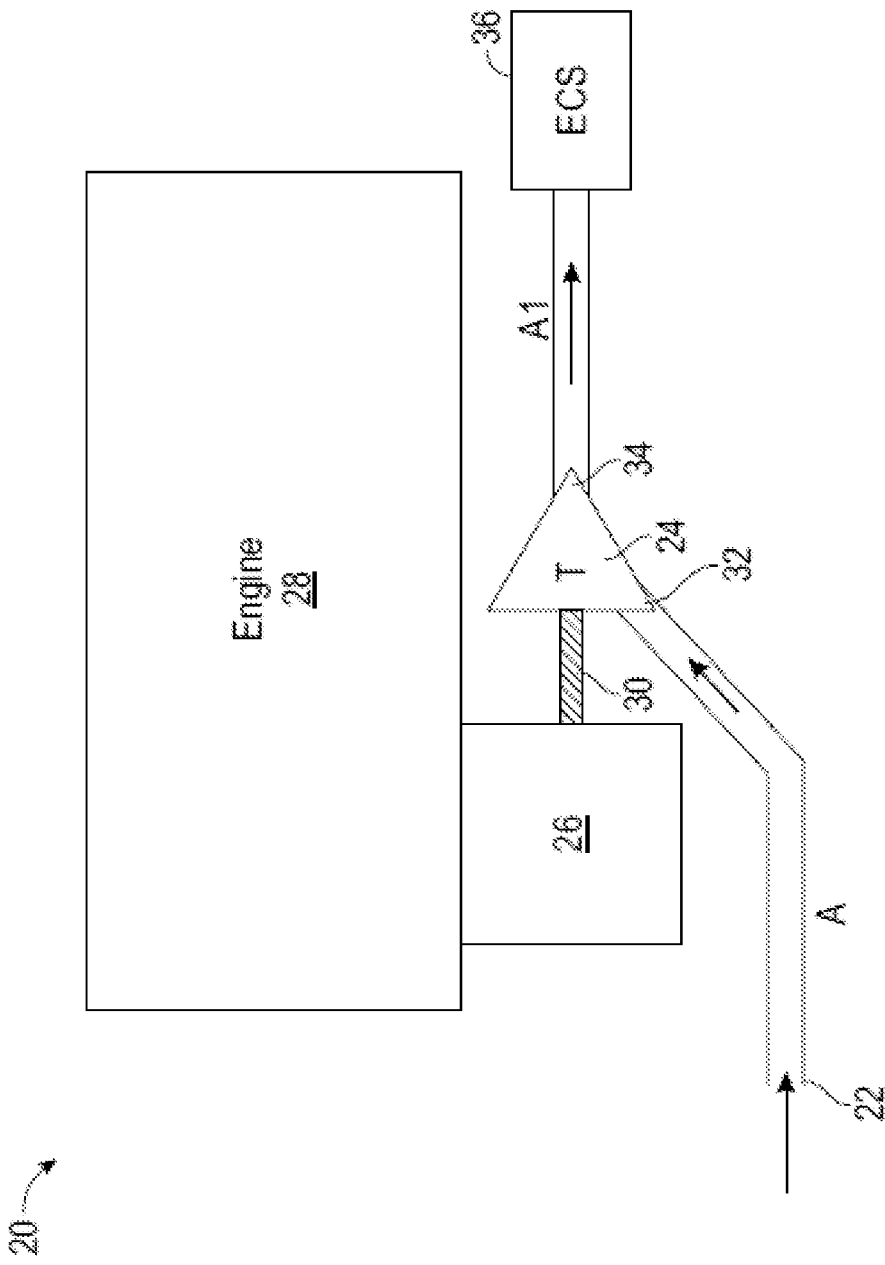

RAM AIR COOLING POWER RECOVERY

BACKGROUND

Embodiments of the present disclosure relate to the art of thermal management and, in particular, to thermal management of one or more loads of a vehicle.

A typical commercial aircraft includes at least several nonintegrated cooling systems configured to provide temperature control to various regions of the aircraft. For example, an aircraft environmental control system primarily provides heating and cooling for the aircraft cabin area. In addition, a galley chiller system is dedicated to refrigerating the food carts in the galleys located throughout the aircraft. Since each system has a significant weight and power requirement, the overall efficiency of the aircraft is affected by these nonintegrated systems.

One or more of these cooling systems may rely on ram or fresh air to condition, i.e., to cool or heat another medium. However, in applications where the aircraft is travelling at supersonic speeds, the temperature of the ram air may be too high to effectively remove heat from another load.

BRIEF DESCRIPTION

According to an embodiment, a cooling system of a vehicle includes an inlet for receiving a medium. A turbine is fluidly connected to the inlet. A coupling mechanism is operably coupled to the turbine by a shaft. The medium is ram air.

In addition to one or more of the features described above, or as an alternative, in further embodiments comprising a component of the vehicle having at least one movable portion, wherein the coupling mechanism is operably coupled to the at least one movable portion.

In addition to one or more of the features described above, or as an alternative, in further embodiments the component of the vehicle having the at least one movable portion is an engine.

In addition to one or more of the features described above, or as an alternative, in further embodiments the at least one movable portion includes a compressor.

In addition to one or more of the features described above, or as an alternative, in further embodiments the at least one movable portion includes another shaft.

In addition to one or more of the features described above, or as an alternative, in further embodiments the coupling mechanism is a gearbox.

In addition to one or more of the features described above, or as an alternative, in further embodiments the turbine is directly connected to the inlet.

In addition to one or more of the features described above, or as an alternative, in further embodiments comprising at least one downstream component fluidly coupled to the turbine outlet, wherein the medium is configured as a heat sink at the at least one downstream component.

In addition to one or more of the features described above, or as an alternative, in further embodiments the vehicle is an aircraft.

In addition to one or more of the features described above, or as an alternative, in further embodiments the vehicle is operable in a supersonic cruise condition.

According to an embodiment, a method of operating a cooling system of a vehicle includes receiving a medium at an inlet, expanding the medium within a turbine to create an expanded medium that is output from a turbine outlet, the turbine being fluidly coupled to the inlet, and transferring energy extracted from the medium within the turbine to a load of the vehicle in response to expanding the medium within the turbine. The medium is ram air.

In addition to one or more of the features described above, or as an alternative, in further embodiments the transferring energy extracted from the medium within the turbine to the load of the vehicle further comprises rotating a shaft of a coupling mechanism operably coupled to the turbine and to the load.

In addition to one or more of the features described above, or as an alternative, in further embodiments the load further comprises a component having at least one movable portion.

In addition to one or more of the features described above, or as an alternative, in further embodiments comprising providing the medium directly from the inlet to the turbine.

In addition to one or more of the features described above, or as an alternative, in further embodiments comprising providing the expanded medium to at least one downstream component, the expanded medium being configured as a heat sink at the at least one downstream component.

In addition to one or more of the features described above, or as an alternative, in further embodiments the at least one downstream component includes an environmental control system comprising a ram air circuit having at least one heat exchanger, the expanded medium being configured to absorb heat at the at least one heat exchanger.

In addition to one or more of the features described above, or as an alternative, in further embodiments the vehicle is an aircraft.

BRIEF DESCRIPTION OF THE DRAWINGS

The following descriptions should not be considered limiting in any way. With reference to the accompanying drawings, like elements are numbered alike:

The FIGURE is a schematic diagram of a portion of a cooling system of a vehicle according to an embodiment.

DETAILED DESCRIPTION

A detailed description of one or more embodiments of the disclosed apparatus and method are presented herein by way of exemplification and not limitation with reference to the FIGURES.

With reference now to the FIGURE, a schematic diagram of a portion of a cooling system 20 of a vehicle is illustrated. The cooling system 20 may be a refrigeration or air cycle subsystem and is configured to receive a medium A at an inlet 22. In the illustrated, non-limiting embodiment, the medium is fresh air, such as outside air for example. This outside air, also referred to herein as RAM air, can be procured via one or more scooping mechanisms, such as an impact scoop or a flush scoop for example. When the cooling system 20 is implemented on an aircraft, the medium A is generally at an ambient pressure equal to an air pressure outside of the aircraft when the aircraft is on the ground and is between an ambient pressure and a cabin pressure when the aircraft is in flight. It should be understood that any suitable medium A is within the scope of the disclosure. For example, other suitable mediums A available on an aircraft include, but are not limited to bleed air, which is pressurized air originating from, i.e., being "bled" from, an engine or auxiliary power unit of the aircraft, or cabin discharge air, which is air leaving the cabin and that would typically be discharged overboard.

It should be understood that the elements of the cooling system 20 are connected via valves, tubes, pipes, and the like. Valves (e.g., flow regulation device or mass flow valve) are devices that regulate, direct, and/or control a flow of a medium by opening, closing, or partially obstructing various passageways within the tubes, pipes, etc. of the system. Valves can be operated by actuators, such that flow rates of the medium in any portion of the cooling system 20 can be regulated to a desired value.

In the illustrated, non-limiting embodiment, the cooling system 20 includes a turbine 24 arranged directly downstream from the inlet 22. As shown, the turbine 24 is operably coupled to a coupling mechanism 26 associated with a load 28 of the vehicle. In the illustrated, non-limiting embodiment the load 28 is an engine of the vehicle and the coupling mechanism 26 is mechanically coupled thereto. In an embodiment, the coupling mechanism 26 is a gearbox including a gear train and the vehicle is an aircraft; however, it should be appreciated that any suitable type of coupling mechanism 26 operable to transmit energy from the turbine 24 to the engine 28 is contemplated herein. Furthermore, the coupling mechanism 26 may be connected to at least one movable portion of the engine, such as a shaft, compressor, or other movable or rotatable component thereof. It should also be understood that the engine 28 is provided as an example only and that the coupling mechanism 26 may be operably coupled to another suitable component of the vehicle that includes one or more moving components and requires energy to drive such moving components.

The turbine 24 may be connected to the coupling mechanism 26 via a shaft 30. Although the turbine 24 and the coupling mechanism 26 are illustrated as being connected directly to the same shaft 30, it should be understood that embodiments where the coupling mechanism 26 is indirectly connected to the turbine 24, such as where the coupling mechanism 26 includes a separate shaft (not shown) connected to the shaft 30 via a coupler are also within the scope of the disclosure. The turbine 24 is a mechanical device that expands a medium and extracts work therefrom (also referred to as extracting energy) to drive the coupling mechanism 26 via the shaft 30. Accordingly, rotation of the turbine 24 extracts energy from the medium A and transmits that energy to coupling mechanism 26 which is in turn, transmitted to a movable component of the engine 28.

In an embodiment, the coupling mechanism 26 is continuously coupled to the engine 28. However, such a connection may add stress and drag on the engine 28 when the vehicle is operated in a mode when a flow of medium A is not provided to the turbine 24, such as during ground operation for example. Accordingly, it should be appreciated that in an embodiment, the coupling mechanism 26 may be selectively coupled to the engine 28, such as via a clutch for example. In embodiments where the coupling mechanism 26 is connectable to the engine 28 via a clutch, the coupling mechanism 26 may only be mechanically coupled to the engine during modes of operation of the vehicle in which energy may be extracted from a flow of medium A provided to the turbine 24.

A method of operating the cooling system 20 when the vehicle is in a first mode at a high altitude, such as during a supersonic cruise condition for example, the medium at the inlet 22 is provided to the turbine inlet 32. Within the turbine 24, the medium A is expanded and work is extracted therefrom. The work extracted from the medium A within the turbine 24 is then transferred to a rotatable component of the engine 28 via the coupling mechanism 26. The expanded medium A1 output from the turbine 24 has a reduced temperature and pressure relative to the medium A provided to the inlet 32 of the turbine 24. From the turbine outlet 34, the expanded medium A1 is delivered to at least one downstream component or systems, illustrated schematically at 36. In the illustrated, non-limiting embodiment, the downstream component is an environmental control system, and the flow of expanded medium may be provided to at least one heat exchanger of a ram air circuit of the environmental control system 36. In such embodiments, the flow of expanded medium may function as a heat sink at the downstream component. However, embodiments where the flow of expanded medium A1 is provided to another component or system of the aircraft are also contemplated herein.

As previously noted, during high speed flight, such as supersonic flight for example, the ram air temperature is elevated, thereby limiting the cooling capacity of the ram air. Inclusion of the turbine 24 as illustrated and described herein is configured to reduce the temperature and pressure of the ram air so that the ram air maintains an adequate flow through the cooling system while enhancing the cooling capacity of the ram air.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A cooling system of a vehicle comprising:
   an inlet for receiving a medium, wherein the medium is ram air; and
   a turbine fluidly connected directly to the inlet, the turbine having a turbine inlet and a turbine outlet; and
   a coupling mechanism operably coupled to the turbine by a shaft and mechanically connected a component of the vehicle having at least one movable portion, wherein energy extracted from the medium at the turbine is transmitted to the at least one movable portion via the coupling mechanism.

2. The cooling system of claim 1, wherein the component of the vehicle having the at least one movable portion is an engine.

3. The cooling system of claim 2, wherein the at least one movable portion includes a compressor.

4. The cooling system of claim 2, wherein the at least one movable portion includes another shaft.

5. The cooling system of claim 1, wherein the coupling mechanism is a gearbox.

6. The cooling system of claim 1, further comprising at least one downstream component fluidly coupled to the turbine outlet, wherein the medium is configured as a heat sink at the at least one downstream component.

7. The cooling system of claim 1, wherein the vehicle is an aircraft.

8. The cooling system of claim 1, wherein the vehicle is operable in a supersonic cruise condition.

9. The system of claim 1, wherein further comprising a clutch, wherein the engine is selectively mechanically connected to the coupling mechanism via the clutch.

\* \* \* \* \*